Patented Feb. 11, 1930

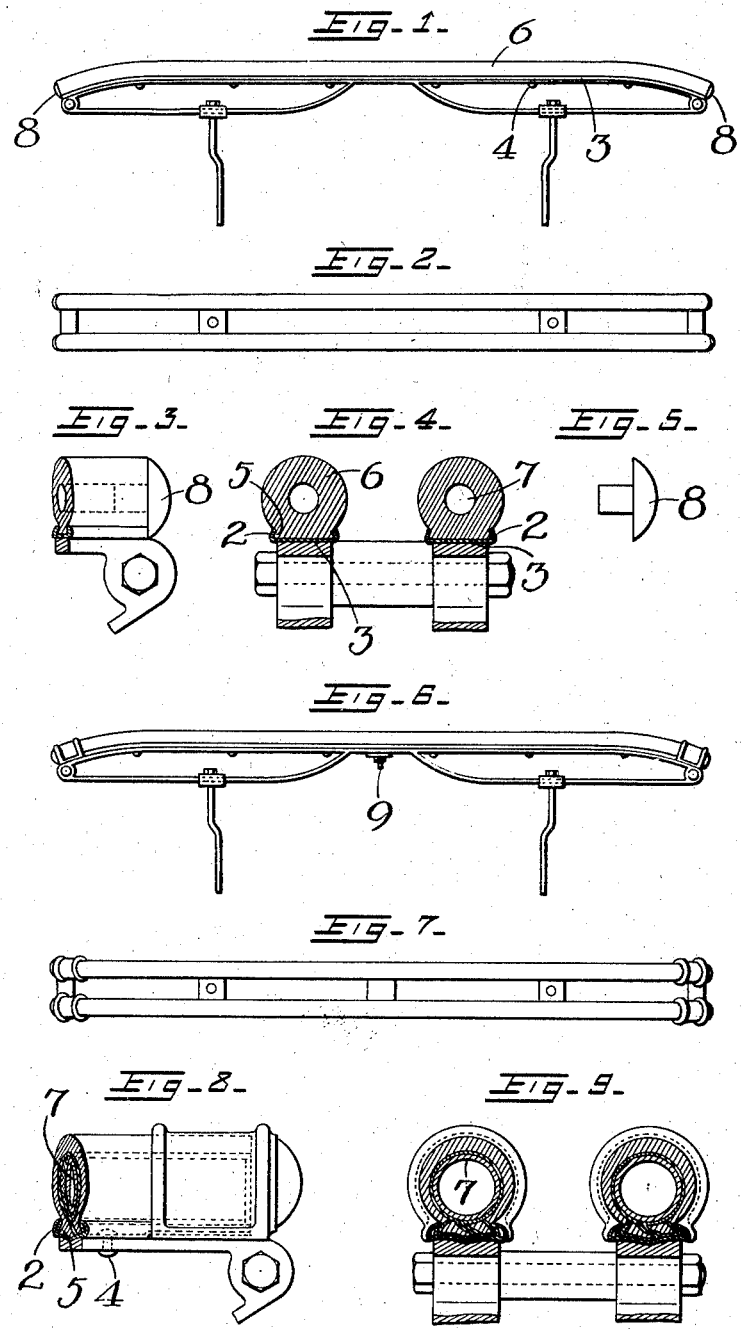

1,746,502

UNITED STATES PATENT OFFICE

RIKICHI SUMI, OF OSAKA, AND TAHIRA KISHI, OF KOBE, JAPAN

BUMPER FOR MOTOR CARS

Application filed December 29, 1927, Serial No. 243,455. Renewed January 3, 1930.

The present invention relates to a new type of bumper for motor-cars which comprises essentially a rubber tire held firmly in position on the front or rear buffer spring plate of a motor-car by setting the rib of the tire between the two flanges provided on the upper and lower edges of the said spring plate. The object of the invention consists in supplying an efficient means for deadening the shock of collision that may occur by accident, so as to minimize, first, the injury to the person riding in the car, secondly, the damage to the car itself, especially the body, fenders, bonnet, radiator, head lights, gasoline tank, etc., and lastly, the damage to the object with which the car may collide.

The disadvantage of the buffer plate hitherto in use lies in the fact that it may get deformed by collision and must be replaced with a new one, or, if not deformed, a scratch left on it greatly mars the appearance. A further disadvantage consists in its becoming rusty by washing the car with water for cleaning, as it is usually nickel-plated.

In the accompanying drawings Fig. 1 represents a plan of the buffer according to the present invention, Fig. 2 a front view of the same, Fig. 3 a partial plan, Fig. 4 a side elevation of transverse section, Fig. 5 a side view of the end-plug. Fig. 6–Fig. 9 show some modifications of the invention and in which Fig. 6 represents a plan, Fig. 7 a front view, Fig. 8 a partial plan enlarged and Fig. 9 a side view of transverse section. The same numerals in the drawings represent the like or similar parts.

In the present invention a supporting plate 3 provided with flanges 2 formed by bending inward the upper and lower edges of said plate is fixed by means of rivets 4 to the front or rear buffer spring plate of a motor car, or the edges of the front or rear spring plate itself may be bent to form the flanges. The rubber tire 6 is held in place on the supporting plate 3 by means of ribs 5 formed on the tire which are set into the two flanges 5. The rubber tire may be either a solid cylindrical rod or a cylindrical rod with a hollow space 7 may be used. A plug 8 is attached to each end of the tire with suitable agglutinants.

Figs. 6–9 represent modifications in which an ordinary pneumatic tire 6 is used in place of a solid rubber tire. In this case two ribs 5 of the tire are set in the flanges 2. The inner tube 7 which can be inflated with air by means of a valve 9, is sealed at both ends with the plug 8.

We claim:

1. A bumper for motor cars comprising a horizontally extending spring plate, a rubber tube secured to the outer side of said plate and reaching to the ends thereof, the inner side of the tube and the outer side of the plate being flat and in contact and the opposite edges of the plate being flanged and overlapping the adjacent sides of the tube, and a plug sealing each end of said tube.

2. A bumper for motor cars having a horizontally extending spring plate, a rubber tube on the outer side of said plate and extending to the ends thereof, the inner side of the tube and the outer side of the plate being flat and in contact and the opposite edges of the plate being flanged and overlapping the adjacent sides of the tube, means securing said tube at each end to the plate comprising a hollow member secured to the plate at the end thereof and encircling the adjacent portion of the rubber tube, a plug closing each end of said tube and an inflating valve situated at the rear of the plate intermediate the ends thereof and communicating with the interior of the tube.

In testimony whereof we hereunto affix our signatures.

RIKICHI SUMI.
TAHIRA KISHI.